US012656284B2

(12) United States Patent 
Ahn et al.

(10) Patent No.: US 12,656,284 B2 
(45) Date of Patent: Jun. 16, 2026

(54) THERMAL CONDUCTIVITY MEASURING DEVICE

(71) Applicants:HYUNDAI MOTOR COMPANY, Seoul (KR); KIA CORPORATION, Seoul (KR)

(72) Inventors: Jun Sung Ahn, Yongin-si (KR); Sang Moo Han, Seoul (KR); Jin Young Heo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 538 days.

(21) Appl. No.: 18/127,730

(22) Filed: Mar. 29, 2023

(65) Prior Publication Data

US 2024/0102952 A1     Mar. 28, 2024

(30) Foreign Application Priority Data

Sep. 26, 2022    (KR) ........................ 10-2022-0121503

(51) Int. Cl. 
*G01N 25/18*          (2006.01) 
(52) U.S. Cl. 
CPC .................................... *G01N 25/18* (2013.01) 
(58) Field of Classification Search 
CPC ...................................................... G01N 25/18 
USPC .................................................. 374/44, 208 
See application file for complete search history.

(56) References Cited

U.S. PATENT DOCUMENTS

| | | | | | |
|---|---|---|---|---|---|
| 3,521,476 | A | * | 7/1970 | Day | ........................ G01N 25/18 |
| | | | | | 374/44 |
| 3,592,060 | A | | 7/1971 | Laverman | |
| 3,733,887 | A | | 5/1973 | Stanley et al. | |
| 8,573,835 | B2 | | 11/2013 | Miller et al. | |
| 10,753,896 | B1 | | 8/2020 | Gaal | |
| 10,775,329 | B2 | | 9/2020 | Tada et al. | |

FOREIGN PATENT DOCUMENTS

| | | | | |
|---|---|---|---|---|
| CN | 102645449 | A | * | 8/2012 |
| CN | 103293182 | B | * | 7/2015 |
| CN | 106093654 | A | * | 11/2016 | ............ G01N 25/20 |
| CN | 112129810 | A | * | 12/2020 | ............ G01N 25/20 |
| CN | 113484144 | A | * | 10/2021 | ............ G01N 25/20 |
| JP | 2006145446 | A | | 6/2006 |
| JP | 2008309729 | A | | 12/2008 |
| JP | 2020193934 | A | * | 12/2020 |
| KR | 102383599 | B1 | | 4/2022 |
| WO | WO-2010103784 | A1 | * | 9/2010 | ............ G01N 25/18 |
| WO | WO-2012020074 | A1 | * | 2/2012 | ............ G01N 25/18 |
| WO | WO-2017073479 | A1 | * | 5/2017 | ............ G01N 25/18 |
| WO | WO-2018110546 | A1 | * | 6/2018 | ............ G01N 25/18 |

OTHER PUBLICATIONS

Translation of WO2010103784A1.*

* cited by examiner

*Primary Examiner* — Mirellys Jagan 
(74) *Attorney, Agent, or Firm* — Lempia Summerfield Katz LLC

(57)          ABSTRACT 
Disclosed is a thermal conductivity measuring device including a sample fixing member that fixes a sample, an elastic member that presses the sample fixed to the sample fixing member downwards, and first auxiliary heat emitting part that is spaced apart from the sample fixing member upwards while the elastic member being interposed therebetween.

12 Claims, 6 Drawing Sheets

<Prior Art>

10

THERMAL CONDUCTIVITY MEASURING DEVICE

CROSS-REFERENCE TO RELATED APPLICATION

This application claims the benefit of and priority to Korean Patent Application No. 10-2022-0121503, filed in the Korean Intellectual Property Office on Sep. 26, 2022, the entire contents of which are incorporated herein by reference.

FIELD

The present disclosure relates to a thermal conductivity measuring device, and more particularly, to a thermal conductivity measuring device that may measure a thermal conductivity of a sample in a low temperature state.

BACKGROUND

Methods for measuring thermal conductivities of samples used for an insulator of a storage tank that stores a fluid such as cryogenic liquid hydrogen, and samples used for an insulator of a space launch vehicle, such as a rocket, may include a normal state absolute measurement method and a normal state relative measurement method. The normal state absolute measurement method measures thermal conductivity by implementing a normal state such that a specific temperature difference is formed between opposite ends by causing heat to flow to a sample having a specific cross-section, and then calculating thermal conductivity in terms of calorie by using measurements such as an effective distance and a temperature difference between the opposite ends of the sample, and a cross-section of the sample. The normal state relative measurement method is a scheme of calculating thermal conductivity by installing a sample that is known in advance together with a sample that needs to have its thermal conductivity measured, and then running a series of relative comparison tests. Among them, since there is not much information on the thermal conductivity of samples under cryogenic condition, the normal state absolute measurement method is required to measure the thermal conductivity of the sample under cryogenic condition.

SUMMARY

The present disclosure has been made to solve the above-mentioned problems occurring in the prior art while advantages achieved by the prior art are maintained intact.

An aspect of the present disclosure solves a problem, in which a precision of measurement of a thermal conductivity of a sample deteriorates as a contact resistance between thermal contractions of different materials in a process of the measuring thermal conductivity of the sample in a cryogenic state becomes high.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a thermal conductivity measuring device includes: a sample fixing member that fixes a sample, an elastic member that presses the sample fixed to the sample fixing member downwards, and first auxiliary heat emitting part that is spaced apart from the sample fixing member upwards while the elastic member being interposed therebetween.

The thermal conductivity measuring device may further include low-temperature forming part, and the sample fixing member may include a first fixing member provided at an upper portion of the low-temperature forming part and that contacts an upper surface of the low-temperature forming part.

The thermal conductivity measuring device may further include a main heat emitting part that is spaced apart from the first fixing member upwards and that provides heat to the sample, the sample fixing member may further include a second fixing member that is spaced apart from the first fixing member upwards and that fixes the sample together with the first fixing member, and the main heat emitting part may be fixed to the second fixing member.

The main heat emitting part is fixed to a side surface of the second fixing member.

A first recess having a shape that is recessed downwards may be formed on an upper surface of the first fixing member such that the sample is inserted thereinto, and a (2-1)-th recess having a shape that is recessed upwards may be formed on a lower surface of the second fixing member such that the sample is inserted thereinto.

The elastic member may be adhered to an upper surface of the second fixing member, a (2-2)-th recess having a shape that is recessed downwards may be formed on the upper surface of the second fixing member, and at least a partial area of the elastic member may be inserted into the (2-2)-th recess.

The thermal conductivity measuring device may further include a third fixing member that is spaced apart from the second fixing member upwards, and in which the elastic member is adhered to a lower surface thereof, and the first auxiliary heat emitting part may be fixed to the third fixing member.

The first auxiliary heat emitting part may be fixed to an upper surface of the third fixing member.

A third recess having a shape that is recessed upwards may be formed on a lower surface of the third fixing member, and at least a partial area of the elastic member may be inserted into the third recess.

The thermal conductivity measuring device may further include a shield member that surrounds a side surface of the sample from an outer side thereof, and that is spaced apart from the side surface of the sample, and a second auxiliary heat emitting part fixed to one side of the shield member.

A main heat emitting part may contact an upper surface of the sample, and the elastic member may contact an upper surface of the main heat emitting part.

The elastic member may contact a lower surface of the first auxiliary heat emitting part.

A plurality of elastic members may be provided, and the plurality of elastic members may be spaced apart from each other in a horizontal direction.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

A thermal conductivity measuring device according to the present disclosure may measure a thermal conductivity of a sample. In more detail, the thermal conductivity measuring device may measure a thermal conductivity of a sample in a cryogenic state. For example, the thermal conductivity measuring device may be used to measure a sample used for an insulator of a storage tank that stores a fluid, such as liquid hydrogen, in a cryogenic state, or a sample used for an insulator of a space launch vehicle, such as a rocket.

When a component, device, element, or the like of the present disclosure is described as having a purpose or performing an operation, function, or the like, the component, device, or element should be considered herein as being "configured to" meet that purpose or to perform that operation or function.

Hereinafter, a thermal conductivity measuring device according to one embodiment of the present disclosure is described with reference to the drawings.

Figure 1:
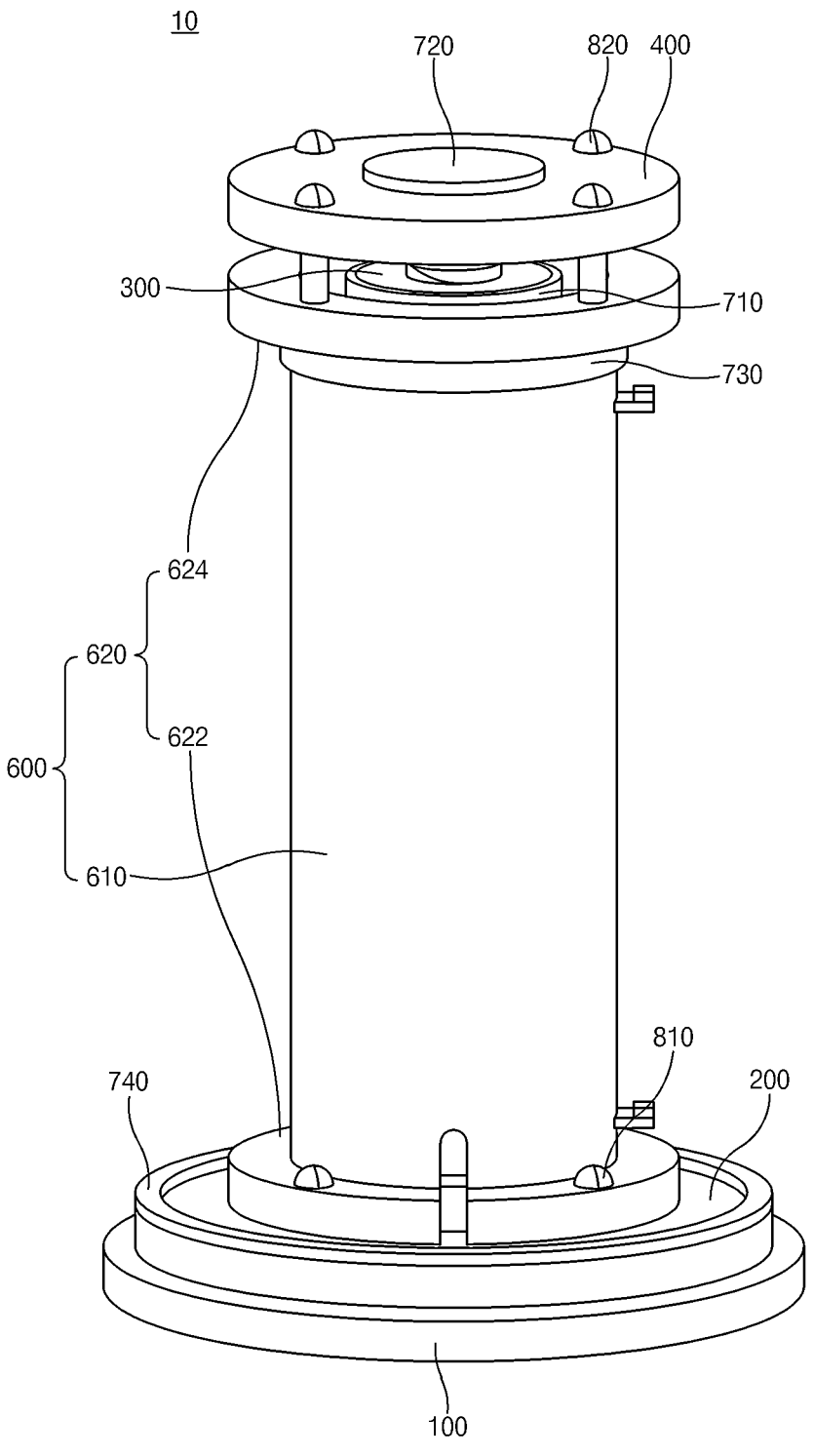
FIG. 1 is a perspective view of a thermal conductivity measuring device according to an embodiment of the present disclosure.
Figure 2:
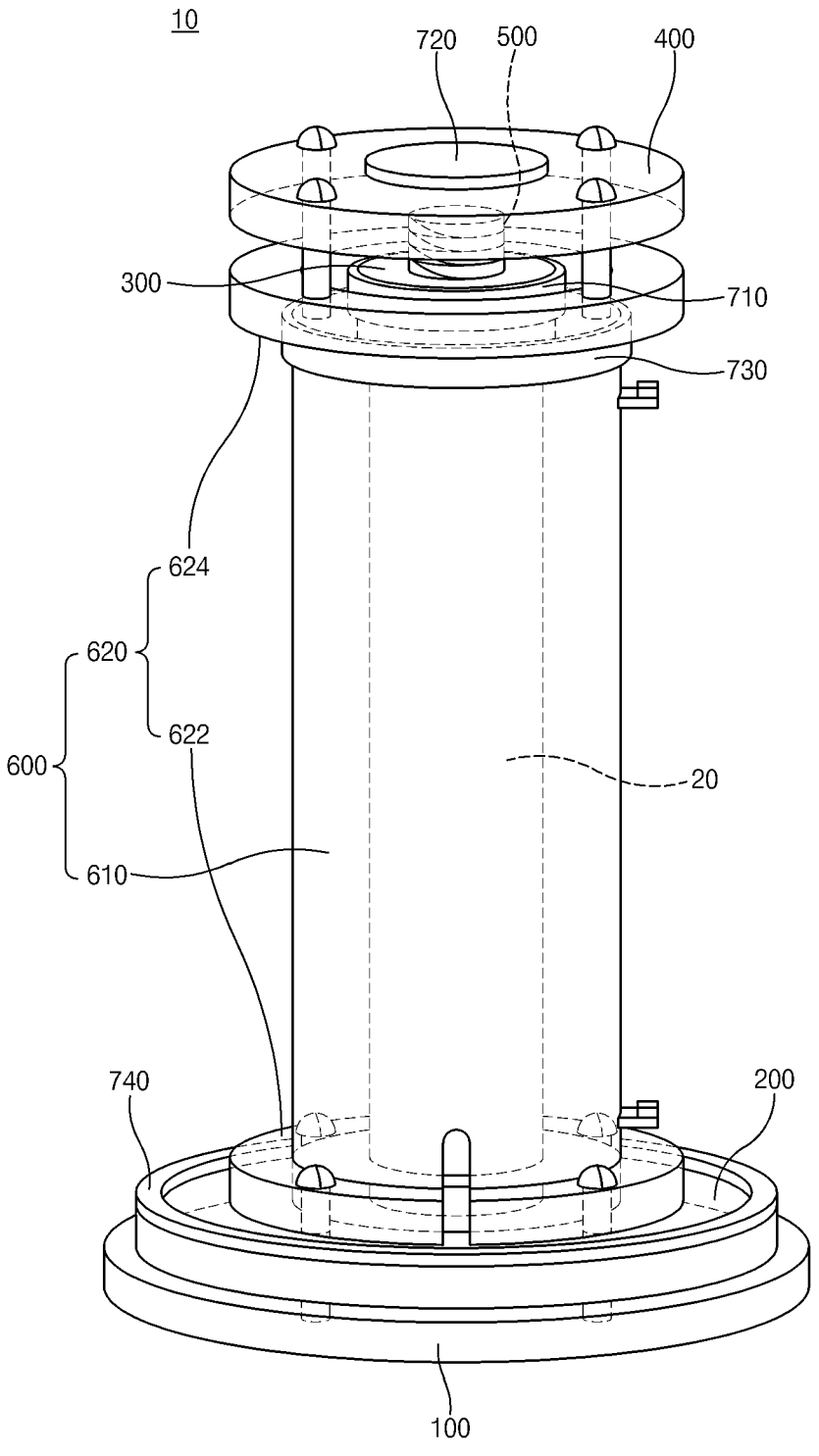
FIG. 2 is a transparent perspective view illustrating an inner structure of a thermal conductivity measuring device according to an embodiment of the present disclosure.
Figure 3:
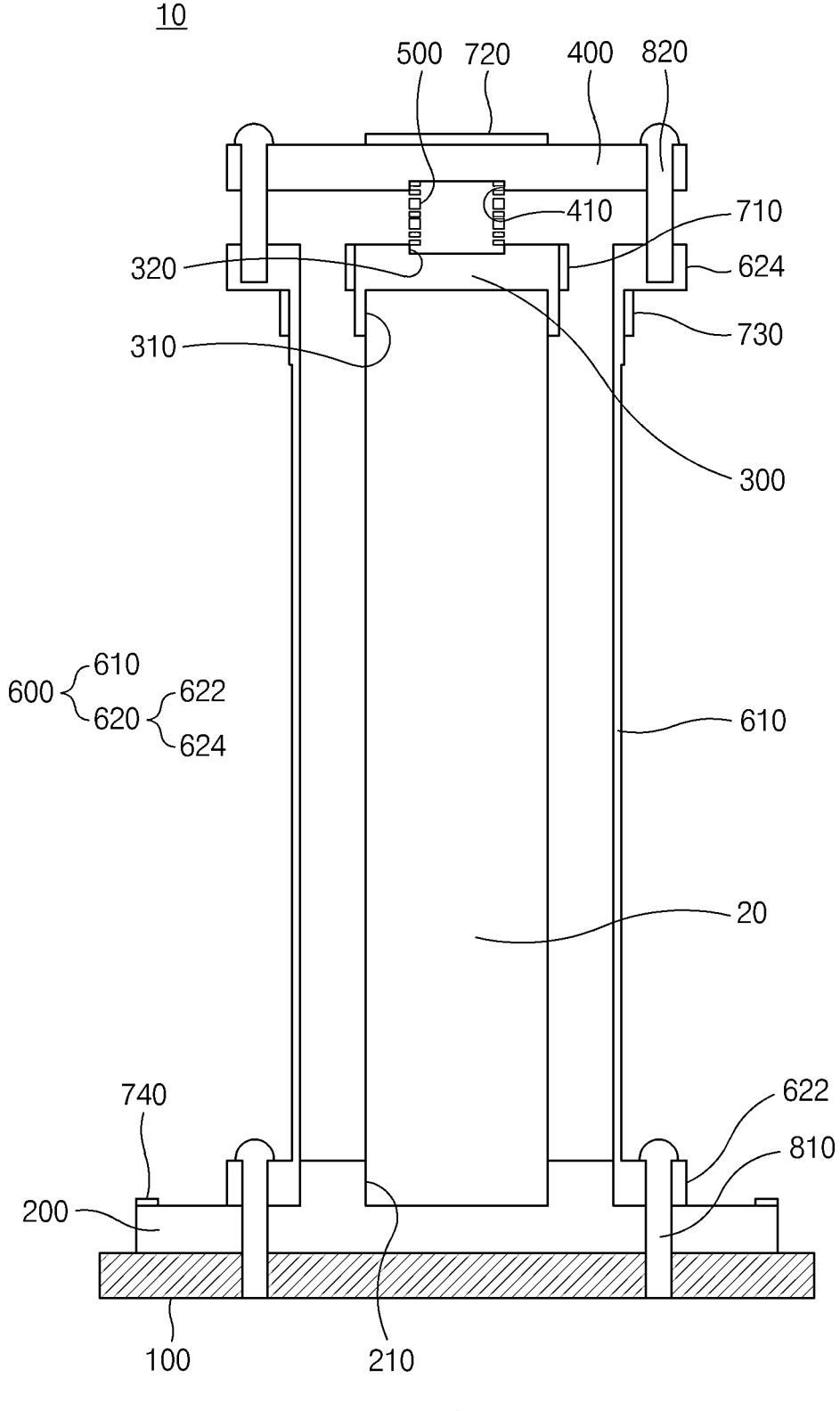
FIG. 3 is a longitudinal sectional view of a thermal conductivity measuring device according to an embodiment of the present disclosure.

FIG. 1 is a perspective view of a thermal conductivity measuring device according to an embodiment of the present disclosure. FIG. 2 is a transparent perspective view illustrating an inner structure of the thermal conductivity measuring device according to an embodiment of the present disclosure. FIG. 3 is a longitudinal sectional view of the thermal conductivity measuring device according to an embodiment of the present disclosure.

Meanwhile, for convenience of description in the specification, a thermal conductivity measuring device 10 is described with reference to a state in which a sample 20, a thermal conductivity of which is to be measured, is mounted on the thermal conductivity measuring device 10 to measure the thermal conductivity of the sample 20. However, it should be considered that the sample 20 is not a configuration of the thermal conductivity measuring device 10 according to the present disclosure.

Referring to FIGS. 1 to 3, the thermal conductivity measuring device 10 may include a low-temperature forming part 100 provided at a lower end of the thermal conductivity measuring device 10. The low-temperature forming part 100 is configured to perform a function of a heat sink, by which a lower end of the sample 20 provided to be adjacent to the low-temperature forming part 100 attains a low temperature. In one embodiment, the low-temperature forming part 100 may be driven to have a specific temperature for measuring the thermal conductivity of the sample

20. As an example, the low-temperature forming part 100 may employ copper or aluminum that is a metal having a high thermal conductivity.

Furthermore, the thermal conductivity measuring device 10 may further include sample fixing members 200 and 300 that are configured to fix the sample. In more detail, the sample fixing member may include the first fixing member 200 that is provided at an upper portion of the low-temperature forming part 100 and is configured to contact an upper surface of the low-temperature forming part 100. The first fixing member 200 may function as a thermal conductor that transfers heat of the sample 20 to the low-temperature forming part 100 while fixing the lower side of sample 20. Meanwhile, although not illustrated explicitly in the drawings, an insulation member may be additionally provided between the first fixing member 200 and the low-temperature forming part 100 to increase the range of thermal conductivity the device may measure.

Furthermore, the above-described sample fixing member may further include the second fixing member 300 that is located above the first fixing member 200 and is configured to fix the sample together with the first fixing member 200. In more detail, the second fixing member 300 may be a configuration for fixing the upper side of sample 20 to the topside of the device.

Subsequently, referring to FIGS. 1 to 3, the thermal conductivity measuring device 10 may further include a main heat emitting part 710 that is spaced apart from the first fixing member 200 upwards and is configured to provide heat to the sample 20. As an example, the main heat emitting part 710 may be fixed to the second fixing member 300. Accordingly, according to the present disclosure, in a process of measuring the thermal conductivity of the sample 20, the sample 20 may have a temperature distribution in which temperature decreases from an upper end to a lower end thereof.

As described above, the lower end of the sample 20 may be adhered to the first fixing member 200, and the upper end of the sample 20 may be adhered to the second fixing member 300. However, because the thermal conductivity measuring device 10 according to the present disclosure is a configuration for measuring the thermal conductivity of the sample 20 in a cryogenic state, the sample 20 and the configurations of the thermal conductivity measuring device 10 are exposed in the process of measuring the thermal conductivity, and thus, the sample 20 and the configurations of the thermal conductivity measuring device 10 may be thermally contracted.

However, because materials of the sample 20 and the configurations of the thermal conductivity measuring device 10 are different, thermal contraction degrees thereof also are different. This means that the adherence of the sample 20 and the configurations of the thermal conductivity measuring device 10 may not be sufficient. For example, the sample 20 and the first fixing member 200 or the sample 20 and the second fixing member 300 may not be sufficient. In this case, a thermal contact resistance between the sample 20 and the first fixing member 200 and a thermal contact resistance between the sample 20 and the second fixing member 300 may increase. If so, because a considerable portion of thermal energy generated by the main heat emitting part 710 is not sequentially delivered to the sample 20, the first fixing member 200, and the low-temperature forming part 100 through thermal conduction and instead diverges to an outside through thermal convection or thermal conduction between configurations, it becomes difficult to measure the thermal conductivity of the sample 20 precisely.

To solve the problem, according to the present disclosure, the thermal conductivity measuring device 10 may further include an elastic member 500 that presses the sample 20 fixed to the first fixing member 200 downwards. In addition, the thermal conductivity measuring device 10 may further include the main heat emitting part 710 and a first auxiliary heat emitting part 720 that is spaced apart from the main heat emitting part 710 and the sample fixing members 200 and 300 with the elastic member 500. In more detail, according to an example of the present disclosure, a lower end of the elastic member 500 may be adhered to an upper surface of the second fixing member 300. Furthermore, the elastic member 500 may have a spring shape. In particular, when the elastic member 500 has a spring shape, an elasticity of the elastic member 500 may be maintained even in a cryogenic state. This is due to the spring shape having a three-dimensional spiral shape of a deflected wire, which means that a thickness of the wire that forms the spring shape also becomes considerably thin and a heat transfer path through thermal conduction is long, minimizing the heat transfer due to thermal conduction. Meanwhile, the elastic member 500 may include or be formed of a material of a low thermal conductivity. For example, the elastic member 500 may include or formed of a stainless steel material.

As described above, when the elastic member 500 is provided, a portion of the thermal energy generated by the main heat emitting part 710 may be transferred not to the sample 20 but to the elastic member 500, which may be an obstruction in measuring the thermal conductivity of the sample 20 precisely. The first auxiliary heat emitting part 720 is a configuration for solving the above-described problem, and may be a configuration for preventing the thermal energy generated by the main heat emitting part 710 from being emitted to the outside through the elastic member 500 by eliminating a temperature difference between a lower end of the elastic member 500, which is adjacent to the main heat emitting part 710, and an upper end of the elastic member 500, which is adjacent to the first auxiliary heat emitting part 720. For example, the elastic member 500 may be a configuration for minimizing a thermal contact resistance due to the thermal contraction generated in the cryogenic state, and the first auxiliary heat emitting part 720 may be a configuration for fully transferring the thermal energy generated by the main heat emitting part 710 to the sample 20 by eliminating the temperature difference between the upper end and the lower end or the elastic member 500, preventing the thermal energy generated by the main heat emitting part 710 from being transferred to the outside through the elastic member 500.

Meanwhile, as described above, a first recess 210 having a shape that is recessed downwards such that the sample 20 is inserted thereinto may be formed on an upper surface of the first fixing member 200 and a (2-1)-th recess 310 having a shape that is recessed upwards such that the sample 20 is inserted thereinto may be formed on a lower surface of the second fixing member 300 whereby the first fixing member 200 and the second fixing member 300 may fix the sample 20. The first recess 210 and the (2-1)-th recess 310 may have shapes corresponding to the lower end and the upper end of the sample 20, respectively.

Furthermore, as illustrated in FIGS. 1 to 3, the main heat emitting part 710 may be fixed to a side surface of the second fixing member 300. However, a fixing location of the main heat emitting part 710 is not limited to the illustration of the drawings.

Meanwhile, a (2-2)-th recess 320 having a shape that is recessed downwards may be additionally formed on an upper surface of the second fixing member 300. Then, at least a partial area of the elastic member 500 may be inserted into the (2-2)-th recess 320. In one embodiment, the lower end of the elastic member 500 may be inserted into the (2-2)-th recess 320 to effectively prevent the elastic member 500 from being separated from the second fixing member 300. The (2-2)-th recess 320 may have a shape corresponding to the lower end of the elastic member 500.

Subsequently, referring to FIGS. 1 to 3, the thermal conductivity measuring device 10 according to an embodiment of the present disclosure may further include a third fixing member 400, which is spaced apart from the second fixing member 300 upwards and in which the elastic member 500 is adhered to a lower surface thereof. The third fixing member 400 may be a configuration for supporting the elastic member 500, and may be a configuration for causing the elastic member 500 to effectively press the second fixing member 300 downwards. Meanwhile, according to an embodiment of the present disclosure, the first auxiliary heat emitting part 720 may be fixed to the third fixing member 400. As an example, the first auxiliary heat emitting part 720 may be fixed to an upper surface of the third fixing member 400. However, unlike this, the first auxiliary heat emitting part 720 may be fixed to a lower surface or a side surface of the third fixing member 400.

Furthermore, a third recess 410 having a shape that is recessed upwards may be formed on a lower surface or the third fixing member 400, and at least a partial area of the elastic member 500 may be inserted into the third recess 410. In one embodiment, the upper end of the elastic member 500 may be inserted into the third recess 410. In other words, the sample 20 may be fixed by the first fixing member 200 and the second fixing member 300, and the elastic member 500 may be fixed by the second fixing member 300 and the third fixing member 400. The third recess 410 may have a shape corresponding to the upper end of the elastic member 500.

Subsequently, referring to FIGS. 1 to 3, the thermal conductivity measuring device 10 according to an example of the present disclosure may further include a shield member 600 that is configured to surround a side surface of the sample 20 from an outside and is spaced apart from the side surface of the sample 20. It may be understood that the sample 20 is accommodated in an inner space of the shield member 600 in a process of measuring the thermal conductivity. The shield member 600 may be a configuration for shielding heat transfer due to convection between an outside of the shield member 600 and the sample 20. In more detail, the shield member 600 may have a cylindrical shape, an upper side and a lower side of which are substantially opened. Meanwhile, the shield member 600 may be formed of a material of a low thermal conductivity. In such case, thermal energy that is necessary for forming a specific temperature gradient in the shield member 600 may be minimized. The temperature gradient of the shield member 600 may be formed by the thermal energy provided by a second auxiliary heat emitting part 730, which is described below. In one embodiment, the shield member 600 may include or formed of a stainless steel material.

Meanwhile, the thermal conductivity measuring device 10 may further include the second auxiliary heat emitting part 730 that is fixed to one side of the shield member 600. The second auxiliary heat emitting part 730 may be a configuration for minimizing heat transfer due to convection between the sample 20 and making a temperature distribution according to an upward/downward height of the shield member 600 the same as or similar to a temperature distribution according to an upward/downward height of the sample 20. In more detail, the second auxiliary heat emitting part 730 may be fixed to an outer surface of an upper area of the shield member 600. This may be understood that the second auxiliary heat emitting part 730 and the sample 20 face each other while the shield member 600 being interposed therebetween. However, unlike this, the second auxiliary heat emitting part 730 may be fixed to an inner surface of the upper area of the shield member 600.

Subsequently, referring to FIGS. 1 to 3, the shield member 600 may be divided into a plurality of areas. In more detail, the shield member 600 may include a vertical extension area 610 that extends in an upward/downward direction to have a length corresponding to an upward/downward length of the sample 20, and a horizontal extension area 620 that extends from a vertical end of the vertical extension area 610 to a horizontally outward side. Then, the vertical height of an upper end of the vertical extension area 610 may correspond to an vertical height of the upper end of the sample 20, and the vertical height of a lower end of the vertical extension area 610 may correspond to a vertical height of the lower end of the sample 20. Furthermore, the second auxiliary heat emitting part 730 may be fixed to an outer surface of an upper end of the vertical extension area 610. In this case, a temperature of the upper end of the vertical extension area 610 and a temperature of the upper end of the sample 20 may be easily adjusted to be the same.

Meanwhile, the above-described horizontal extension area 620 may include a lower horizontal extension area 622 that extends from a lower end of the vertical extension area 610 to the horizontally outer side, and an upper horizontal extension area 624 that extends from an upper end of the vertical extension area 610 to the horizontally outer side. Then, the lower horizontal extension area 622 may be configured to be adhered to an upper surface of the first fixing member 200.

Furthermore, according to an embodiment of the present disclosure, the thermal conductivity measuring device 10 may further include a lower fixing member 810 that connects and fixedly couples the lower horizontal extension area 622, the first fixing member 200, and the low-temperature forming part 100. As an example, the lower fixing member 810 may be a bolt member that passes through the lower horizontal extension area 622, the first fixing member 200, and the low-temperature forming part 100 in the upward/downward direction.

Furthermore, according to an embodiment of the present disclosure, the thermal conductivity measuring device 10 may further include an upper fixing member 820 that connects and fixedly couples the upper horizontal extension area 624 and the third fixing member 400. As an example, the upper fixing member 820 may be a bolt member that is inserted into and coupled to the upper horizontal extension area 624 and the third fixing member 400.

Meanwhile, the upper fixing member 820 may include or be formed of a material of a low thermal conductivity. In doing so, heat exchange between the upper horizontal extension area 624 and the third fixing member 400 through the upper fixing member 820 may be minimized. For example, the upper fixing member 820 may include or be formed of plastic of a low thermal conductivity.

Meanwhile, the upper horizontal extension area 624 and the third fixing member 400 may be spaced apart from each other in the upward/downward direction. This may be for forming a space, in which the elastic member 500 may be disposed, by spacing the third fixing member 400 and the second fixing member 300 apart from each other. Furthermore, when the upper horizontal extension area 624 and the third fixing member 400 are spaced apart from each other in the upward/downward direction, the heat exchange between the upper horizontal extension area 624 and the third fixing member 400 may be minimized.

Meanwhile, as illustrated in FIGS. 1 to 3, the thermal conductivity measuring device 10 may further include a third auxiliary heat emitting part 740 that is fixed to the first fixing member 200. The third auxiliary heat emitting part 740 may be used for adjusting a peripheral temperature more precisely when the conductivity of the sample 20 is measured. It works by raising temperatures of the configurations of the thermal conductivity measuring device 10 as a whole. As an example, the third auxiliary heat emitting part 740 may be fixed to a horizontally outer area of an upper surface of the first fixing member 200.

Meanwhile, a separate grease layer may be applied between the first fixing member 200 and the sample 20 and between the second fixing member 300 and the sample 20 to additionally reduce a thermal contact resistance between the first fixing member 200 and the sample 20 and between the second fixing member 300 and the sample 20. In one embodiment, the above-described grease layer is formed of a material that is not frozen at an extremely low temperature. Meanwhile, as described above, because it is difficult to precisely measure the thermal conductivity of the sample 20 when thermal conduction through the elastic member 500 occurs, the above-described grease layer may be applied neither between the elastic member 500 and the second fixing member 300 nor between the elastic member 500 and the third fixing member 400.

Furthermore, because the first fixing member 200, the second fixing member 300, and the third fixing member 400 may serve as mediums for heat transfer by the thermal conduction, they are formed of a material having a high thermal conductivity.

Meanwhile, as illustrated in FIGS. 1 and 2, the above-described heat emitting parts 710, 720, 730, and 740 may have ring shapes, but the shapes of the heat emitting parts 710, 720, 730, and 740 are not limited by the above-described contents.

Figure 4:
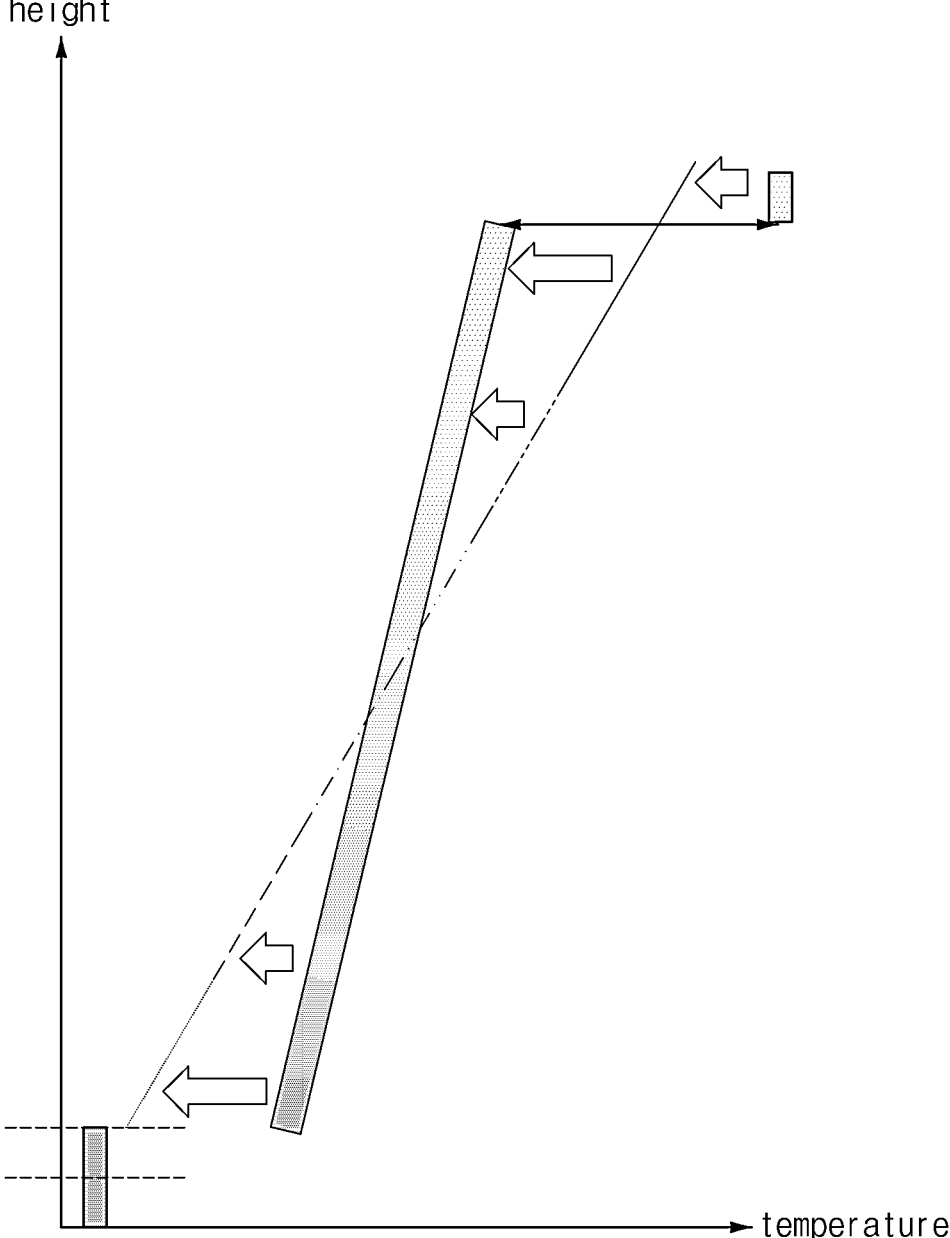
FIG. 4 is a graph depicting a temperature distribution of a sample when a thermal conductivity of the sample is measured according to a thermal conductivity measuring device according to a conventional technology.
Figure 5:
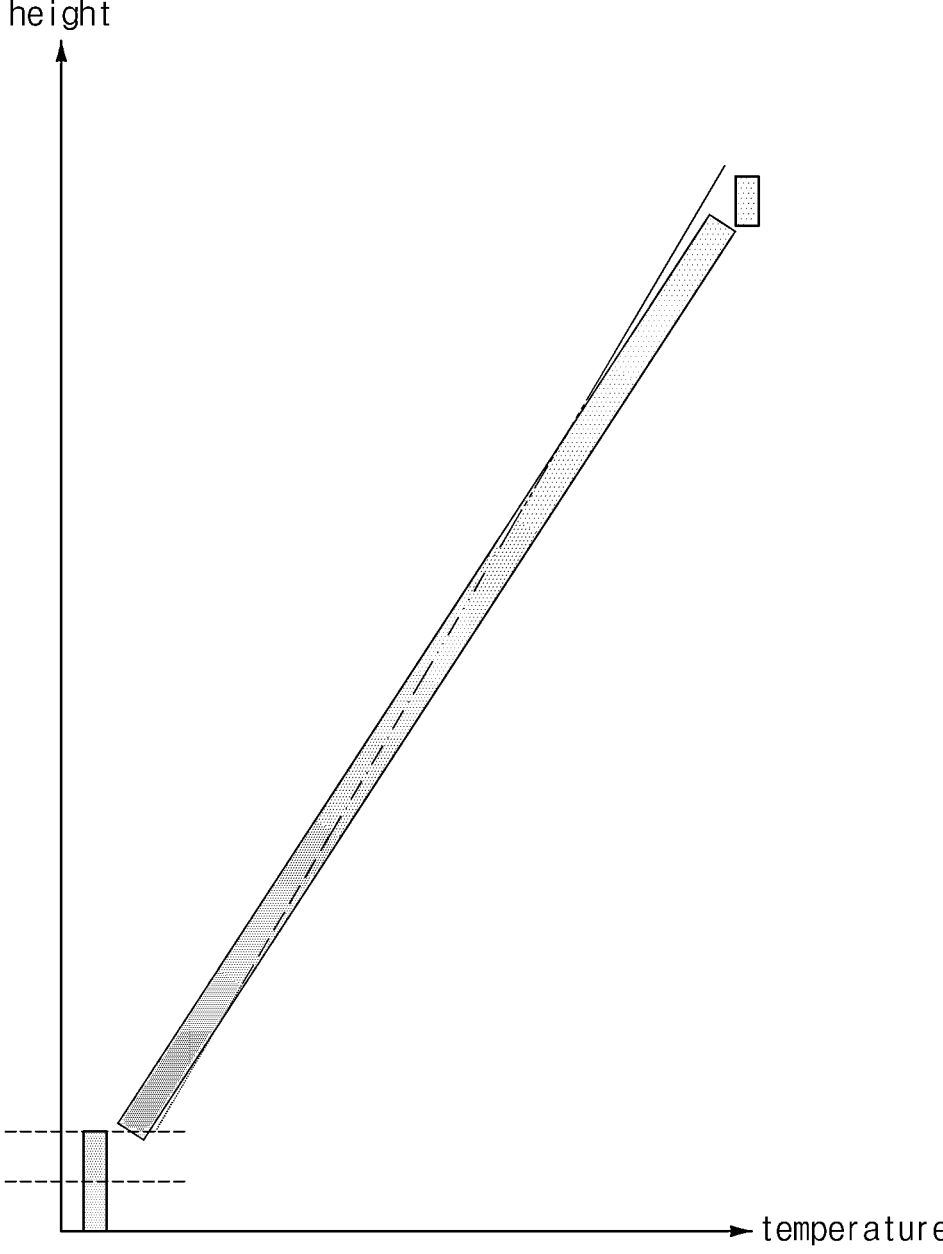
FIG. 5 is a graph depicting a temperature distribution of a sample when a thermal conductivity of the sample is measured according to a thermal conductivity measuring device according to the present disclosure.

FIG. 4 is a graph depicting a temperature distribution of a sample when a thermal conductivity of the sample is measured according to a thermal conductivity measuring device according to a conventional technology. FIG. 5 is a graph depicting a temperature distribution of a sample when a thermal conductivity of the sample is measured according to a thermal conductivity measuring device according to the present disclosure.

In FIGS. 4 and 5, the graph in a form of a bar formed to have a specific inclination depicts a temperature distribution according to a height of the sample, among the graphs in the form of two bars extending in the upward/downward direction, the graph formed on an upper side depicts a temperature of a heat emitting part (the main heat emitting part of the present disclosure) that is configured to heat the sample, and among the graphs in the form of two bars extending in the upward/downward direction, the graph formed on a lower side depicts a temperature of the heat sink (corresponding to the low-temperature forming part of the present disclosure), by which the thermal energy of the heat emitting part is emitted through thermal conduction.

As illustrated in FIG. 4, according to the conventional technology, because there is no configuration for pressing the sample and the configurations of the thermal conductivity measuring device downwards, a thermal contact resistance between the sample and the heat emitting part and a thermal contact resistance between the sample and the heat sink are increased. Accordingly, because the thermal energy generated by the heat emitting part cannot be transferred to the sample properly, a temperature difference between the sample and the heat emitting part and a temperature difference between the sample and the heat sink becomes significantly large. Accordingly, when the thermal conductivity of the sample is measured, a big error occurs.

Meanwhile, as illustrated in FIG. 5, according to the present disclosure, because the elastic member 500 that presses the sample 20 downwards is provided, a thermal contact resistance between the sample 20 and the first fixing member 200 and a thermal contact resistance between the sample 20 and the second fixing member 300 may be significantly reduced. In addition, because the first auxiliary heat emitting part 720 is additional provided, transfer of the thermal energy generated by the main heat emitting part 710 to the elastic member 500 may be minimized.

Figure 6:
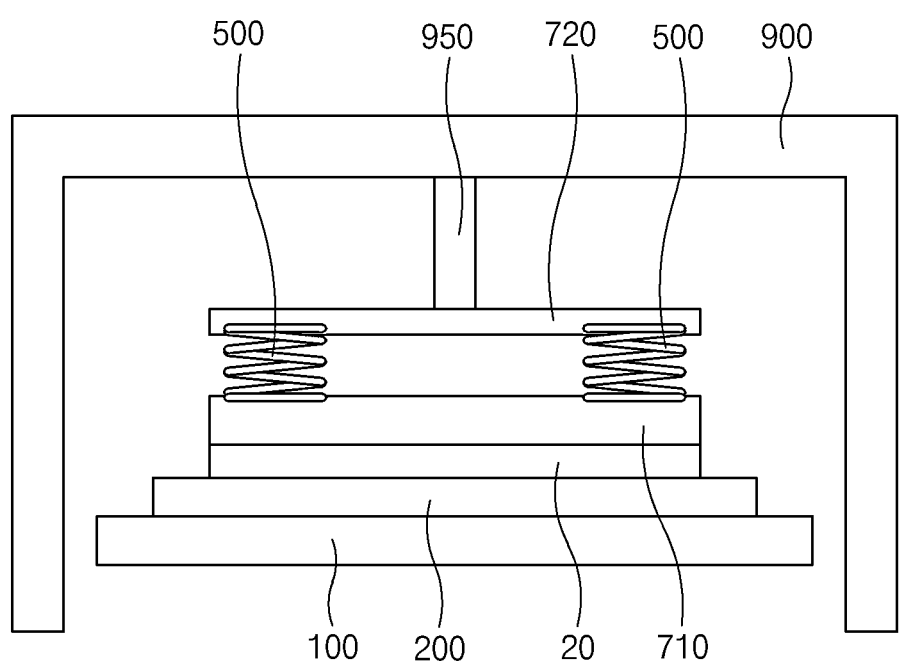
FIG. 6 is a longitudinal sectional view of a thermal conductivity measuring device according to another embodiment of the present disclosure.

FIG. 6 is a longitudinal sectional view of a thermal conductivity measuring device according to another embodiment of the present disclosure.

The thermal conductivity measuring device 10 according to the another example of the present disclosure may be the same as the thermal conductivity measuring device 10 according to the example of the present disclosure in that it includes the low-temperature forming part 100, the first fixing member 200 that is provided at an upper portion of the low-temperature forming part 100 and is configured to contact the upper surface of the low-temperature forming part 100 and fix the sample, the main heat emitting part 710 that is spaced apart from the first fixing member 200 upwards and is configured to provide heat to the sample 20, the elastic member 500 that is provided at an upper portion of the main heat emitting part 710 to press the sample 20 fixed to the first fixing member 200 downwards, and the first auxiliary heat emitting part 720 that faces the main heat emitting part 710 while the elastic member 500 is interposed therebetween. Meanwhile, according to another example of the present disclosure which is illustrated in FIG. 6, the main heat emitting part 710 may be understood as a concept including both of the main heat emitting part and the first fixing member described in the thermal conductivity measuring device.

Based on the above-described contents, according to the another example of the present disclosure, the main heat emitting part 710 may be configured to directly contact the upper surface of the sample 20, and the elastic member 500 may be configured to directly contact the upper surface of the main heat emitting part 710. In other words, instead of the above-described configuration corresponding to the second fixing member 300, the main heat emitting part 710 also may perform the above-described function of the second fixing member. More specifically, the elastic member 500 may be configured to contact the lower surface of the first auxiliary heat emitting part 720.

Meanwhile, as illustrated in FIG. 6, according to the another embodiment of the present disclosure, a plurality of elastic members 500 may be provided to be spaced apart from each other in a horizontal direction. FIG. 6 illustrates an example state in which two elastic members 500 are provided.

The thermal conductivity measuring device 10 according to another example of the present disclosure may be suitable for measuring the thermal conductivity of the sample in a form of a film having a relatively small thickness. In this case, according to the another example of the present disclosure, because the heat transfer due to the convection heat between the outside and the sample 20 may be extremely low, the above-described shield member 600 may not be provided. However, the thermal conductivity measuring device 10 may include a cover member 900 that accommodates the low-temperature forming part 100, the first fixing member 200, the sample 20, the main heat emitting part 710, the first auxiliary heat emitting part 720, and the elastic member 500, and an insulation member 950, which extends from an upper area of the cover member 900 downwards and a lower end of which is adhered to the first auxiliary heat emitting part 720. The insulation member 950 may be a configuration for causing the elastic member 500 to press the main heat emitting part 710 and the sample 20 downwards by pressing the first auxiliary heat emitting part 720 downwards.

According to the present disclosure, a problem, in which a precision of measurement of a thermal conductivity of a sample deteriorates as a contact resistance between thermal contractions of different materials in a process of measuring the thermal conductivity of the sample in a cryogenic state is increased, may be solved.

Although it is apparent that the present disclosure has been described with reference to the limited embodiments and the drawings, the present disclosure is not limited thereto, and the present disclosure may be variously carried out by an ordinary person in the art within the technical spirit of the present disclosure.

What is claimed is:

1. A thermal conductivity measuring device comprising:
   a sample fixing member configured to fix a sample;
   an elastic member configured to press the sample fixed to the sample fixing member downwards;
   a first auxiliary heat emitting part configured to be spaced apart from the sample fixing member upwards while the elastic member is interposed therebetween;
   a low-temperature forming part,
   wherein the sample fixing member includes:
      a first fixing member provided at an upper portion of the low-temperature forming part and configured to contact an upper surface of the low-temperature forming part, and
      a second fixing member configured to be spaced apart from the first fixing member upwards and configured to fix the sample together with the first fixing member; and
   a main heat emitting part configured to be spaced apart from the first fixing member upwards and configured to provide heat to the sample,
   wherein the main heat emitting part is fixed to the second fixing member, and—the main heat emitting part is fixed to a side surface of the second fixing member.

2. The thermal conductivity measuring device of claim 1, wherein a plurality of elastic members are provided, and
   wherein the plurality of elastic members are spaced apart from each other in a horizontal direction.

3. The thermal conductivity measuring device of claim 1, wherein a first recess having a shape that is recessed downwards is formed on an upper surface of the first fixing member such that the sample is inserted thereinto, and
   wherein a (2-1)-th recess having a shape that is recessed upwards is formed on a lower surface of the second fixing member such that the sample is inserted thereinto.

4. The thermal conductivity measuring device of claim 3, wherein the elastic member is adhered to an upper surface of the second fixing member, wherein a (2-2)-th recess having a shape that is recessed downwards is formed on the upper surface of the second fixing member, and wherein at least a partial area of the elastic member is inserted into the (2-2)-th recess.

5. A thermal conductivity measuring device comprising:

a sample fixing member configured to fix a sample;

an elastic member configured to press the sample fixed to the sample fixing member downwards;

a first auxiliary heat emitting part configured to be spaced apart from the sample fixing member upwards while the elastic member is interposed therebetween;

a low-temperature forming part;

a main heat emitting part configured to prove heat to the sample, wherein the sample fixing member includes:

a first fixing member provided at an upper portion of the low-temperature forming part and configured to contact an upper surface of the low-temperature forming part;

a second fixing member configured to be spaced apart from the first fixing member upwards and configured to fix the sample together with the first fixing member; and a third fixing member configured to be spaced apart from the second fixing member upwards, and in which the elastic member is adhered to a lower surface thereof, wherein the first auxiliary heat emitting part is fixed to the third fixing member and wherein the main heat emitting part is spaced apart from the first fixing member upwards and fixed to the second fixing member.

6. The thermal conductivity measuring device of claim 5, wherein the first auxiliary heat emitting part is fixed to an upper surface of the third fixing member.

7. The thermal conductivity measuring device of claim 5, wherein a recess having a shape that is recessed upwards is formed on a lower surface of the third fixing member, and wherein at least a partial area of the elastic member is inserted into the third recess.

8. The thermal conductivity measuring device of claim 5, further comprising:

a shield member configured to surround a side surface of the sample from an outer side thereof, and configured to be spaced apart from the side surface of the sample; and a second auxiliary heat emitting part fixed to one side of the shield member.

9. The thermal conductivity measuring device of claim 5, wherein a first recess having a shape that is recessed downwards is formed on an upper surface of the first fixing member such that the sample is inserted thereinto, and wherein a (2-1)-th recess having a shape that is recessed upwards is formed on a lower surface of the second fixing member such that the sample is inserted thereinto.

10. The thermal conductivity measuring device of claim 9, wherein the elastic member is adhered to an upper surface of the second fixing member, wherein a (2-2)-th recess having a shape that is recessed downwards is formed on the upper surface of the second fixing member, and wherein at least a partial area of the elastic member is inserted into the (2-2)-th recess.

11. A thermal conductivity measuring device comprising:

a sample fixing member configured to fix a sample;

an elastic member configured to press the sample fixed to the sample fixing member downwards; and a first auxiliary heat emitting part configured to be spaced apart from the sample fixing member upwards while the elastic member is interposed therebetween, wherein a main heat emitting part is in direct contact with an upper surface of the sample, and wherein the elastic member is in direct contact with an upper surface of the main heat emitting part.

12. The thermal conductivity measuring device of claim 11, wherein the elastic member is configured to contact a lower surface of the first auxiliary heat emitting part.

* * * * *